(12) United States Patent
Lange

(10) Patent No.: US 8,688,364 B2
(45) Date of Patent: Apr. 1, 2014

(54) METHOD FOR DETERMINING A REMAINING RANGE

(75) Inventor: Rainer Lange, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/988,201

(22) PCT Filed: Nov. 14, 2011

(86) PCT No.: PCT/EP2011/005717
§ 371 (c)(1),
(2), (4) Date: Jul. 29, 2013

(87) PCT Pub. No.: WO2012/065709
PCT Pub. Date: May 24, 2012

(65) Prior Publication Data
US 2013/0325309 A1   Dec. 5, 2013

(30) Foreign Application Priority Data

Nov. 19, 2010  (DE) .......................... 10 2010 051 713
Nov. 19, 2010  (DE) .......................... 10 2010 051 714
Jun. 15, 2011  (DE) .......................... 10 2011 104 258

(51) Int. Cl.
*G01C 21/30*  (2006.01)
(52) U.S. Cl.
USPC .......................................... 701/123; 701/512
(58) Field of Classification Search
USPC .................................................. 701/123, 512
See application file for complete search history.

(56) References Cited

U.S. PATENT DOCUMENTS

| 5,539,399 A | 7/1996 | Takahira et al. |
| 2003/0006914 A1 | 1/2003 | Todoriki et al. |
| 2010/0138098 A1 | 6/2010 | Takahara et al. |
| 2010/0228472 A1* | 9/2010 | Nagel et al. .................... 701/201 |

FOREIGN PATENT DOCUMENTS

| DE | 4344368 | 5/1995 |
| DE | 10302504 | 9/2004 |
| DE | 60308499 | 9/2007 |
| DE | 102007016108 | 10/2007 |
| DE | 102008037262 | 5/2009 |
| DE | 102009008327 | 8/2010 |
| DE | 102010051546.9 | 11/2010 |
| DE | 102010051714.3 | 11/2010 |

(Continued)

OTHER PUBLICATIONS

International Preliminary Report on Patentability for PCT/EP2011/005717, mailed on May 30, 2013, 14 pages.

(Continued)

*Primary Examiner* — Mary Cheung
*Assistant Examiner* — Yuen Wong
(74) *Attorney, Agent, or Firm* — Staas & Halsey LLP

(57) ABSTRACT

A method determines a partial area of a map which is described by features, the partial area describing the remaining range of a motor vehicle. An energy-storage system supplies a drive system which acts on at least one wheel of the motor vehicle. The remaining range is determined as a function of energy stored in the energy-storage system using an algorithm which expands from a current position of the motor vehicle. The method uses divides the map into geometric, in particular rectangular, structures of equal size. Whenever, in the context of the expansion, a feature lying in a structure or corresponding to a structure is added, the structure is added to the partial area.

11 Claims, 3 Drawing Sheets

(56) References Cited

FOREIGN PATENT DOCUMENTS

| DE | 1020100051713.5 | 11/2010 |
|---|---|---|
| DE | 102011104258.3 | 6/2011 |
| EP | 1275936 | 1/2003 |
| EP | 2172740 | 4/2010 |
| WO | PCT/EP2011/005717 | 11/2011 |

OTHER PUBLICATIONS

International Search Report for PCT/EP2011/005717, mailed on Feb. 22, 2012.

\* cited by examiner

METHOD FOR DETERMINING A REMAINING RANGE

CROSS REFERENCE TO RELATED APPLICATIONS

This application is based on and hereby claims priority to International Application No. PCT/EP2011/005717 filed on Nov. 14, 2011 and German Application Nos. 10 2010 051 714.3 filed on Nov. 19, 2010, 10 2010 051 713.5 filed on Nov. 19, 2010 and 10 2011 104 258.3 filed on Jun. 15, 2011, the contents of which are hereby incorporated by reference.

BACKGROUND

The invention relates to a method for determining a partial area of a map described by features, which partial area describes the remaining travel range of a motor vehicle, and to an associated motor vehicle.

Motor vehicles having energy storage systems for their drives have, on the one hand, a remaining travel range dependent on the energy currently stored in the energy storage system and have, on the other hand, a consumption when they cover a certain distance. Therefore, in particular for motor vehicles having navigation systems, methods for determining the remaining travel range of a motor vehicle and informing a driver of this with the aid of the navigation system have been proposed. For example, a travel range can be displayed in a superimposed manner using an area of a map display of a navigation system, which area is determined from maximum reachable points. In this case, regions which can still be reached with the currently stored energy and can be reached without returning can be indicated in one color, and other regions which can be reached by returning to the current location can be indicated in another color (pictorial presentation of a "fried egg" form in which "yellow=return" and "white=reachable"). Such a procedure is known, for example, from DE 10 2008 037 262 A1.

In order to determine the remaining travel range of a motor vehicle, it has been proposed to use algorithms which are also used to determine distances to be traveled to a destination in a navigation system. In this case, the so-called Dijkstra algorithm or a derivative of the Dijkstra algorithm is usually used. The Dijkstra algorithm is based on ultimately moving through the map data from branch possibility to branch possibility starting from the starting position or current position, with an optimum route to a destination being able to be determined using a cost function, often the fastest passage time. Dijkstra algorithms which ultimately feel their way through the map material or expand from a starting position are also suitable for calculating the remaining travel range if the cost function is based on the energy consumed for the section as costs. However, when determining the remaining travel range, there is no special destination since it is necessary to proceed in all directions and the process is aborted if the energy which is consumed along the route corresponds to or exceeds the energy currently stored in the energy storage system. This means that an enormous computation time and a very large amount of calculation complexity are required in order to determine a remaining travel range or points which can currently still be reached.

In addition, the Dijkstra algorithm is very inaccurate for calculating the remaining travel range, at least in the case of larger remaining travel ranges, since the actual consumption additionally depends on the driving style, the ambient conditions, the traffic and the like. The inaccuracy of the Dijkstra algorithm ultimately increases at least quadratically with the energy which is still available, with the result that a relatively large degree of uncertainty can be expected.

It has been proposed to take into account only larger roads, for example freeways and possibly also federal highways, within the scope of the Dijkstra algorithm, but only points where this type of road is also present are then obtained as the maximum reachable points. Roads of a lower category which lead away from these freeways and could potentially be reached are then possibly displayed as unreachable in the display.

An alternative algorithm is proposed in the post-published patent application DE 10 2010 051 546.9-53, in which, instead of the map data of the Dijkstra algorithm, it is proposed to base the latter on area segments which are each assigned energy costs, possibly in a direction-dependent manner, which are needed to cross the respective area segment. Such area segments may be selected, for example, to be relatively large, for instance with a size of 2 km*2 km. "Following" the area segments therefore results in total in a consumption of the motor vehicle on the route followed. In this case, the calculation can be carried out in a similar manner to the Dijkstra algorithm, with an expansion ultimately being made from a first area segment, in which the motor vehicle is currently located for example, to a second area segment which adjoins the first area segment and is assigned the lowest energy costs of all area segments adjoining the first area segment. In the next step, an expansion is then made from the first and second area segments to a third area segment which adjoins the first area segment and is assigned the lowest energy costs, after the second area segment, of all area segments adjoining the first area segment or adjoins the second area segment if the first, second and third area segments are in total assigned lower energy costs than are assigned in total to the first area segment and to the area segment which is assigned the lowest energy costs, after the second area segment, of all area segments adjoining the first area segment. This method is iteratively continued for the next area segments. Alternatively or additionally, the area segments may be expanded in a star-shaped manner and/or recursively in order to calculate the travel range. The travel range calculation on an expansion path can be aborted if the sum of the energy costs of the area segments reaches or exceeds a predefined amount of energy, in particular the amount of energy currently stored in the energy storage system. This algorithm can be carried out with a considerably smaller amount of calculation complexity than the Dijkstra algorithm based on the road system, with the result that resources and time can be saved. Although the algorithm is more heuristic than the Dijkstra algorithm, this is less relevant, in particular in the case of large travel ranges, since the influences which are not detected by the algorithm and have already been discussed above give rise to a certain inaccuracy anyway.

The result of the known algorithms is ultimately a point cloud of maximum still reachable points or area segments which are stored if the residual energy which is still available has been consumed. The points in this point cloud are then associated with an area, for example by a polyline, and it is assumed that the resulting partial area of the map section indicates the reachable regions. However, considerable errors occur in the resultant partial area with this procedure. In experiments carried out by the applicant, errors of up to 30-40%, even more in special cases, occurred, which means that 30-40% of the remaining travel range displayed can in actual fact no longer be reached or 30-40% of the regions displayed as unreachable can be reached. These effects occur, in particular, when certain regions are not developed in terms of traffic. If situated, for example, at the corner of an island, it may be the case that there are no determined reachable end points in certain regions around the current position of the motor vehicle since only the sea simply exists there, but no roads. If short roads end at the coast, for example, without the residual energy being equal to zero, no end points are set at these locations. These roads are therefore displayed as potentially unreachable (which is incorrect). If the end points are now used to calculate the partial area, for example as the result of an envelope calculation, for example a convex envelope, around the Dijkstra end points, actually reachable regions are excluded. However, other effects also result in errors.

SUMMARY

One possible object is specifying a more reliable method for determining a partial area of a map indicating the remaining travel range.

In order to achieve this object, in the case of a method for determining a partial area of a map described by features, which partial area describes the remaining travel range of a motor vehicle comprising an energy storage system for supplying a drive acting on at least one wheel of the motor vehicle, the remaining travel range being determined on the basis of energy stored in the energy storage system by an algorithm which expands starting from the current position of the motor vehicle. According to the proposed method, the map is divided into structures of the same size, in particular rectangular geometrical structures, to be used, in which case, whenever a feature lying in a structure or corresponding to a structure is added during the expansion, the structure is added to the partial area.

It is therefore proposed to already determine the basic form of the partial area while carrying out the route-finding algorithm for the maximum reachable end points. Geometrical structures, in particular rectangles, are therefore superimposed on the map, with geometrical structures which contain features which form part of the route which is currently being considered being marked as "visited" during expansion over the course of the algorithm. The geometrical structures are therefore ultimately assigned a type of "flag" which indicates whether this geometrical structure was visited during expansion starting from the current position. The resultant partial area is then a formation of contiguous geometrical structures, in particular contiguous rectangles, which represents the possible remaining travel range with any desired high degree of accuracy, depending on the size of the geometrical structures. For example, rectangles with a size of 1 km*1 km or larger, in particular 2 km*2 km, may be used as geometrical structures here.

With the proposals, it is therefore ultimately irrelevant, for determining the partial area, whether an end point at which the energy stored in the energy storage system is completely consumed is actually reached, since the corresponding geometrical structures can be marked as belonging to the partial area even in the case of considered routes which end in a cul-de-sac or the like on which it is not possible to continue. Overall, this therefore results not only in a higher degree of accuracy when calculating the remaining travel range partial area but also dispenses with degenerative special cases, for example on islands, or other cases in which particular regions are accessible only up to a particular travel range.

In this case, provision may be made for a Dijkstra algorithm or a route-finding algorithm derived from the latter to be used as the algorithm, with energy values being considered in the cost function. With these algorithms, there are various expansion possibilities, for instance a star-shaped or recursive expansion, but also more complex procedures. All of these procedures have the feature in common that a distance which can be covered with the remaining residual energy is gradually found. Since this is carried out gradually, it is possible to mark the geometrical structures as belonging to the partial area without any problems.

In a preferred refinement, an algorithm which assigns energy values to an area segment and considers the area segments during expansion is used as the algorithm. In this respect, reference should be made, for example, to the post-published application DE 10 2010 051 546.9-53 which has already been discussed. One particularly advantageous embodiment may provide for the geometrical structures to correspond to the area segments. Since the expansion of the algorithm then takes place via the area segments anyway, every "entered" area segment can easily be directly marked as a sought geometrical structure and thus part of the partial area. This results in a particularly advantageous embodiment of the method which allows not only the use of an algorithm having a small amount of calculation complexity but also additionally allows more accurate and less error-prone determination of the partial area in a particularly simple implementation.

Another refinement of the method may provide for the edge of the partial area to be smoothed, and/or for regions which are surrounded by the partial area and do not belong to the partial area to be added to the partial area. Both variants are ultimately used to improve a subsequent representation of the partial area since a smoother edge provides a more agreeable image when viewed by the driver of the motor vehicle, for example. In order to produce a closed partial area, provision may also be made for regions which are surrounded by the partial area and do not belong to the partial area to be added to the partial area. Such regions may arise if, for example, regions are not accessible by traffic routes, for example in the case of mountains, lakes and the like. In order to provide a uniform image, these regions can be added to the partial area.

As already mentioned, provision may also be made for the partial area to be displayed together with the map on a display apparatus of the motor vehicle in a manner such that it can be distinguished from regions of the map which do not belong to the partial area. For example, regions which can be reached may be displayed using a different color than regions which cannot be reached, for example by virtue of a geometrical structure belonging to the partial area having a different color than a geometrical structure which does not belong to the partial area. It goes without saying that it is also possible to consider the boundary of the partial area, if appropriate in smoothed form, in order to produce the representation.

Provision may also be made for an energy storage system having a fuel tank and/or a battery to be used as the energy storage system. The method can therefore be advantageously used both for pure electric motor vehicles or motor vehicles which can be operated only using an internal combustion engine and for hybrid vehicles.

In addition to the method, the invention also relates to a motor vehicle having a drive acting on at least one wheel of the motor vehicle, an energy storage system for supplying the drive and a calculation apparatus designed to carry out the method. All statements with regard to the method can be analogously applied to the motor vehicle, with the result that the advantages can also be achieved with the motor vehicle; in particular, the remaining travel range can be displayed in a more reliable and accurate manner in the form of the partial area of the map.

In this case, provision may also be made for the calculation apparatus to be part of a navigation system. Navigation systems usually have route-finding algorithms anyway, with the result that components of a route calculation may possibly also be used to calculate the remaining travel range and the like. In addition, the functionality of the remaining travel range calculation can most likely be assigned to a navigation system, with the result that implementation of the function in a navigation system is also advantageous.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
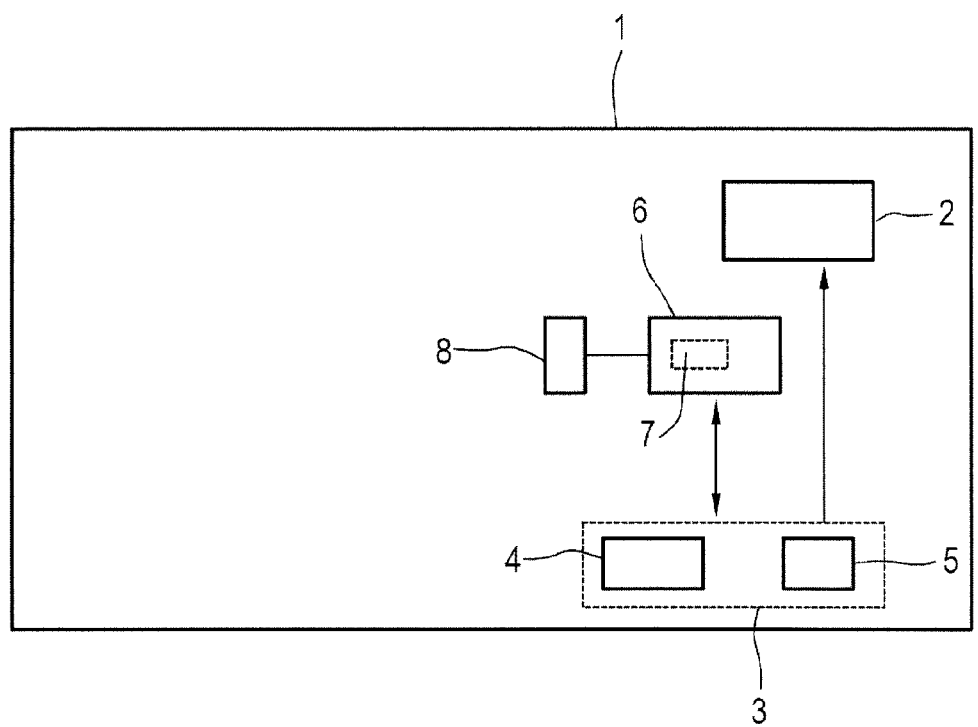
FIG. 1 shows a basic sketch of a proposed motor vehicle.

Reference will now be made in detail to the preferred embodiments of the present invention, examples of which are illustrated in the accompanying drawings, wherein like reference numerals refer to like elements throughout.

FIG. 1 shows a basic sketch of a proposed motor vehicle 1. The exemplary embodiment involves a hybrid vehicle, which means that the energy storage system 3 assigned to the drive 2 comprises both a fuel tank 4 and a battery 5. Data relating to the residual energy currently available in the energy storage system 3 are forwarded to a navigation system 6 which comprises a calculation apparatus 7. The latter is designed to carry out the proposed method, which means that the remaining travel range is calculated using an algorithm which expands starting from the current position of the motor vehicle 1, geometrical structures, rectangles here, which are visited during expansion and are produced by dividing the map under consideration being assigned to a partial area which describes the remaining travel range in the map, which is intended to be described in yet more detail below.

The navigation system 6 is also connected to a display apparatus 8 on which the partial area describing the remaining travel range can be displayed together with the map, in particular in a manner superimposed on the latter.

As already mentioned, the method is ultimately based on a route-finding algorithm oriented to the energy consumption on a route section, the route sections being at least related to the map. Conventional Dijkstra algorithms which are directly oriented to existing traffic routes, the sections of which are therefore inevitably situated inside one or more geometrical structures of the map, are conceivable in this case. The assignment is therefore easily possible here. However, it is preferred to use an algorithm of the type described in the German patent application DE 10 2010 051 546.9-53 in which energy costs assigned to area segments are used, for which purpose the specific exemplary embodiment is also intended to be described. In the exemplary embodiment described here, these area segments advantageously correspond to the geometrical structures, which means that the map is broken down into area segments of the same size which are each assigned energy costs needed to cross the segment, these energy costs also being able to be direction-dependent. In this case, the area segments may have a size of 1 km*1 km or 2 km*2 km, for example. Starting from the area segment in which the current position of the motor vehicle is situated, a route-finding operation is now started within the scope of an expansion and ultimately provides different routes on which the motor vehicle reaches an end point with the remaining residual energy. Each of these area segments is added, as a geometrical structure, to the partial area as soon as it is crossed by the route-finding algorithm while the residual energy has not yet been consumed, which partial area ultimately describes the travel range of the motor vehicle.

Figure 2:
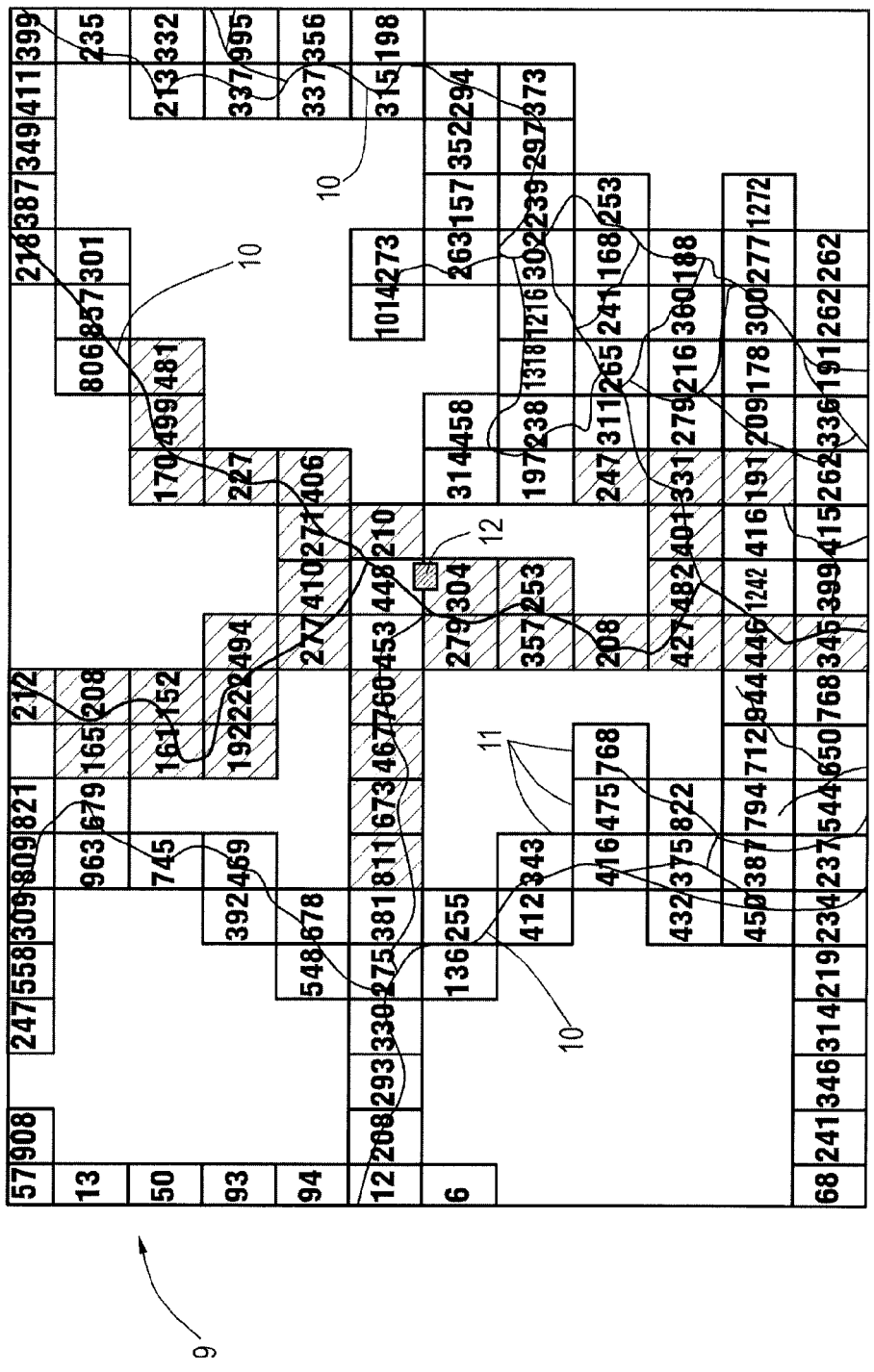
FIG. 2 shows a sketch for carrying out the proposed method.

This is explained in more detail using the illustration in FIG. 2. The latter shows an excerpt 9 of the map in which different roads 10 can be seen, as is fundamentally known. These roads run through rectangular area segments 11 which also correspond to the geometrical structures. Each of the area segments 11 is assigned a value for the energy costs needed to cross the segment, which is illustrated by the number shown in the area segment 11. The current position of the motor vehicle 1 is indicated by the square 12.

Starting from this area segment, the route-finding algorithm now gradually proceeds to adjoining area segments 11 until the residual energy has been consumed. In this case, area segments visited (illustrated using hatching here) are marked as part of the partial area. This results in a contiguous set of marked area segments which, after the conclusion of the calculations of the algorithm, exactly reproduces which regions of the map can be reached with the available residual energy.

The partial area determined in this manner can then be post-processed for better representation, in particular by finding a smoothed boundary of the partial area and/or by adding regions of the map which are surrounded by the partial area to the partial area in order to enable a complete and agreeable appearance even in the case of regions which are not developed by traffic routes and the like.

Figure 3:
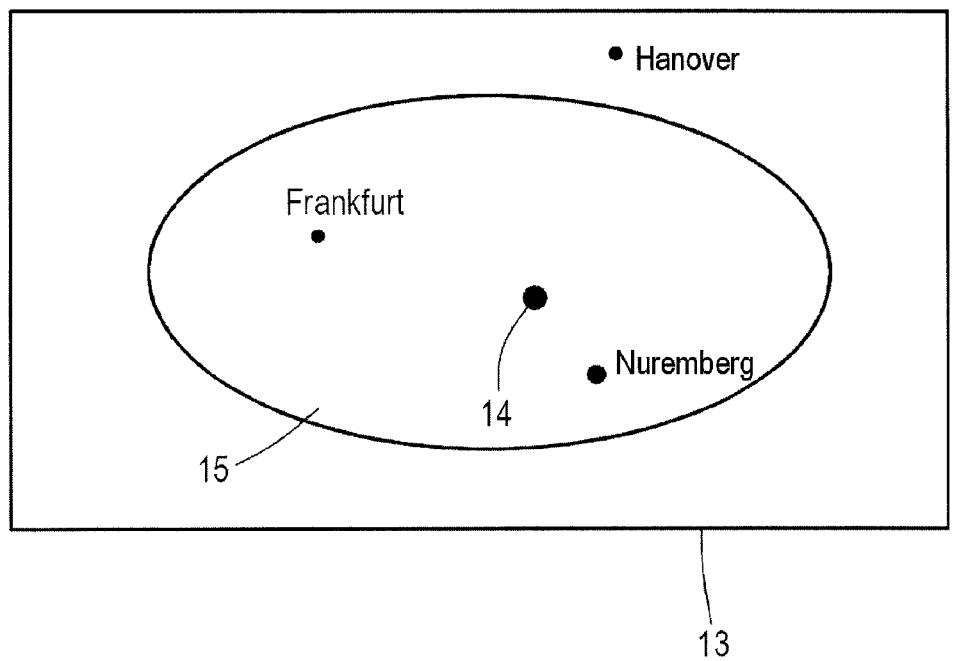
FIG. 3 shows a basic sketch of a possible representation of the partial area with a map.

The map is then displayed on the display apparatus 8 with the partial area, which is explained in more detail by FIG. 3 in the form of a basic sketch.

The current position 14 is displayed on the map 13 in addition to the conventional map information, for example the position of cities. Regions lying inside the partial area 15 are displayed in this case in a different color than regions lying outside the partial area 15 which may be displayed in red, for example. It goes without saying that other colors or color combinations are also conceivable.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for determining a partial area of a map, which partial area describes a remaining travel range of a motor vehicle, comprising:

determining, using a computer, the remaining travel range based on energy remaining in an energy storage system for supplying a drive acting on at least one wheel of the motor vehicle, the remaining travel range being determined with an algorithm that expands starting from a current position of the motor vehicle and adds map features while expanding; and dividing the map into rectangular geometrical structures of equal size, wherein whenever a map feature lying in a geometrical structure is added while expanding, the geometrical structure is added to the partial area.

2. The method according to claim 1, wherein
the algorithm is a Dijkstra algorithm or a route-finding algorithm derived from the Dijkstra algorithm, and
the algorithm uses energy values as a cost function.

3. The method according to claim 1, wherein the algorithm assigns energy values to area segments and considers the area segments while expanding.

4. The method according to claim 3, wherein the geometrical structures correspond to the area segments.

5. The method according to claim 1, wherein an edge of the partial area is smoothed, and/or regions which are surrounded by the partial area and do not belong to the partial area are added to the partial area.

6. The method according to claim 1, further comprising smoothing an edge of the partial area and filling in holes in the partial area so as to add regions to the partial area if the regions are at least partially surrounded by the partial area.

7. The method according to claim 1, wherein
the partial area is displayed together with the map on a display apparatus of the motor vehicle, and
the partial area is displayed in a manner such that it can be distinguished from regions of the map which do not belong to the partial area.

8. The method according to claim 1, wherein the energy storage system comprises a fuel tank and/or a battery.

9. The method according to claim 1, wherein the energy storage system comprises a fuel tank and a battery.

10. A motor vehicle comprising:
a drive acting on at least one wheel of the motor vehicle;
an energy storage system for supplying the drive with energy; and
a calculation apparatus to determine a partial area of a map, which partial area describes a remaining travel range of the motor vehicle, the remaining travel range being determined based on energy remaining in the energy storage system, the remaining travel range being determined with an algorithm that expands starting from a current position of the motor vehicle and adds map features while expanding, the calculation apparatus dividing the map into rectangular geometrical structures of equal size, such that whenever a map feature lying in a geometrical structure is added while expanding, the geometrical structure is added to the partial area.

11. The motor vehicle according to claim 10, wherein the calculation apparatus is part of a navigation system.

\* \* \* \* \*